(12) United States Patent
Smiltneek et al.

(10) Patent No.: US 8,020,839 B2
(45) Date of Patent: Sep. 20, 2011

(54) MODULAR SYSTEMS AND METHODS FOR FLUID DISPERSION

(75) Inventors: Gregory P Smiltneek, Menomonee Falls, WI (US); Robert B Wheeler, Johnson Creek, WI (US); Martin M Smiltneek, Oconomowoc, WI (US)

(73) Assignee: Prototype Advancement LLC, Pewaukee, WI (US)

( * ) Notice: Subject to any disclaimer, the term of this patent is extended or adjusted under 35 U.S.C. 154(b) by 1240 days.

(21) Appl. No.: 11/712,268

(22) Filed: Feb. 28, 2007

(65) Prior Publication Data

US 2008/0135648 A1 Jun. 12, 2008

Related U.S. Application Data

(60) Provisional application No. 60/873,784, filed on Dec. 8, 2006.

(51) Int. Cl.
*B01F 3/04* (2006.01)
(52) U.S. Cl. ............... 261/122.1; 261/124; 261/DIG. 70
(58) Field of Classification Search ............... 261/121.1, 261/122.1, 122.2, 124, DIG. 70
See application file for complete search history.

(56) References Cited

U.S. PATENT DOCUMENTS

| | | | |
|---|---|---|---|
| 3,087,641 A | 4/1963 | Millard | |
| 3,711,072 A * | 1/1973 | Waldenville | 261/122.1 |
| 3,911,068 A * | 10/1975 | Hamilton | 261/121.1 |
| 3,926,810 A * | 12/1975 | Gudernatsch et al. | 210/220 |
| 3,953,555 A | 4/1976 | Gley | |
| 4,273,731 A * | 6/1981 | Laurie et al. | 261/77 |
| 4,288,394 A | 9/1981 | Ewing et al. | |
| 4,563,277 A | 1/1986 | Tharp | |
| 4,929,397 A * | 5/1990 | Jager | 261/65 |
| 4,973,432 A | 11/1990 | Desjardins et al. | |
| 4,975,197 A | 12/1990 | Wittmann et al. | |
| 5,348,650 A | 9/1994 | Cummings | |
| 5,584,996 A | 12/1996 | Petit | |
| 6,260,831 B1 * | 7/2001 | Jager | 261/122.1 |
| 6,478,964 B1 * | 11/2002 | Redmon | 210/620 |
| 6,644,342 B1 | 11/2003 | Bogan et al. | |
| 6,977,038 B2 | 12/2005 | Jowett | |
| 7,243,911 B2 * | 7/2007 | Abiko et al. | 261/122.1 |
| 7,622,040 B2 * | 11/2009 | Mitchell et al. | 210/242.2 |
| 7,806,389 B2 * | 10/2010 | Abello et al. | 261/122.1 |
| 2002/0179738 A1 * | 12/2002 | Callies et al. | 239/450 |

* cited by examiner

*Primary Examiner* — Charles Bushey
(74) *Attorney, Agent, or Firm* — Law Offices of Michael L. Wise, LLC

(57) ABSTRACT

Modular systems and methods for fluid dispersion are provided. A base module includes a modular frame structure and fluid distribution conduits secured within the frame structure. Diffuser assemblies or other equipment may be coupled to the fluid distribution conduits via a mating tube. The mating tube is inserted into an aperture in the wall of the fluid distribution conduit, and provides a fluid tight joining method.

25 Claims, 8 Drawing Sheets

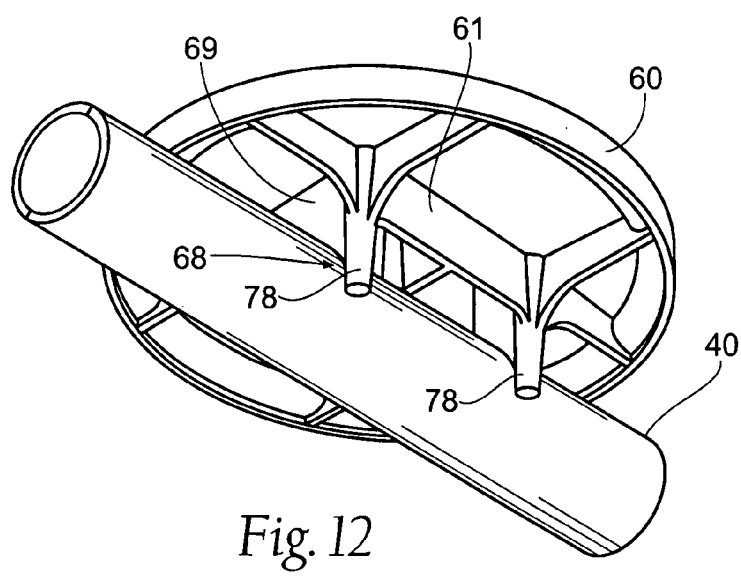
Fig. 12
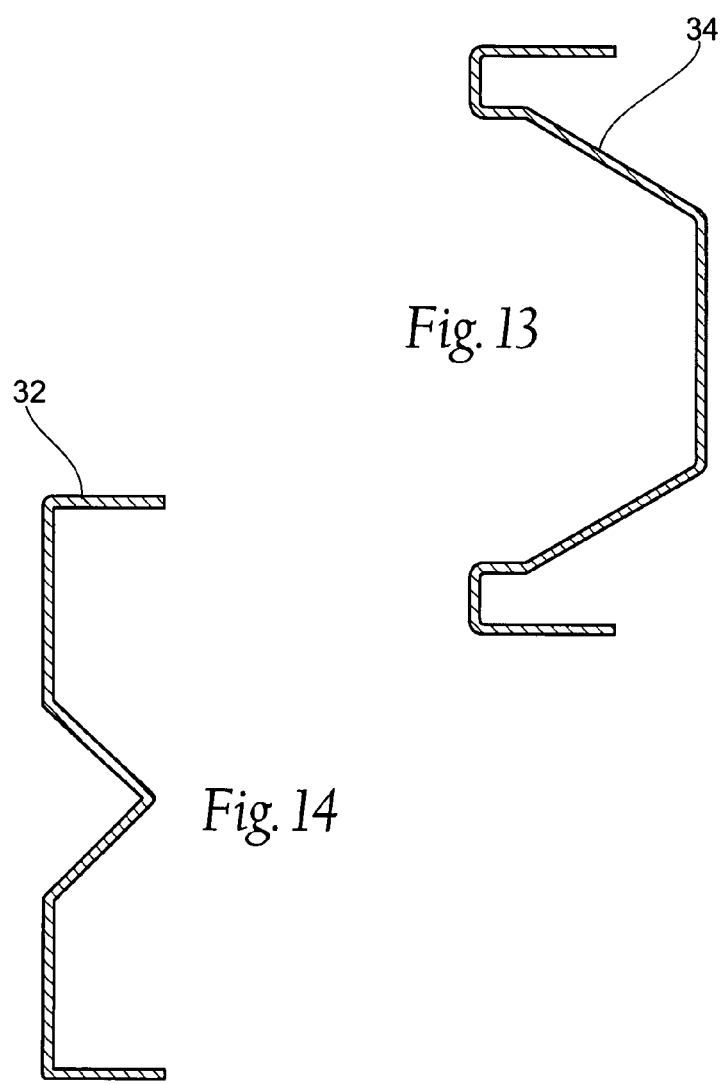
Fig. 13
Fig. 14

MODULAR SYSTEMS AND METHODS FOR FLUID DISPERSION

RELATED APPLICATION

This application claims the benefit of U.S. Provisional Patent Application Ser. No. 60/873,784, filed Dec. 8, 2006, and entitled "Modular Systems and Methods for Fluid Dispersion," which is incorporated herein by reference.

FIELD OF THE INVENTION

The present invention relates generally to systems and methods for dispersing a fluid, and more particularly for modular systems and methods able to disperse a fluid, such as air, into another fluid.

BACKGROUND OF THE INVENTION

Biological treatment of wastewater or sewage is known and has been used for some time to remove solids and clarify the wastewater for reuse or for safer disposal. A number of different system configurations are possible. In one configuration, the wastewater is in a tank, and at the top or bottom of the tank is a mechanism for dispersing a fluid into the wastewater. The term "fluid" as used herein, is intended to include a substance, such as a liquid or gas, that is capable of flowing and that changes its shape at a steady rate when acted upon by a force tending to change its shape. The dispersed fluid used in wastewater treatment is most commonly air.

The fluid dispersion mechanism at or near the bottom of the tank typically effects an upward movement of the wastewater in the tank. This movement or rolling of the wastewater is important to keeping the suspended solids in suspension and is essential to effect the needed mixing of the tank contents for the biological process which is carried out in the tank. The use of a dispersed fluid, such as air, is intended to supply the microorganisms of the biological process with the required dissolved oxygen. For that purpose, the air is diffused or discharged as bubbles of a predetermined size to provide the maximum possible air-water interface area per volume of air. The partial pressures of the free and dissolved oxygen then determine the rate of transfer of oxygen from the air to the water. The length of time the bubbles remain in the liquid is in part a function of the efficiency of the tank.

Known systems include a number of different configurations for dispersing a fluid into wastewater. Some configurations include a mechanism positioned within the wastewater (e.g., submerged), and other configurations include a mechanism positioned on top of the wastewater (e.g., rotating contactor). These systems are generally complicated assemblies that require extensive time and effort to manufacture, transport, and install.

There remains the need to provide systems and methods for dispersing a fluid that are modular in configuration to reduce the time and costs of manufacture, transportation, and installation.

SUMMARY OF THE INVENTION

In one representative application, the modular systems and methods for fluid dispersion are well suited for use in a sewage treatment facility. The modular systems are used to disperse a fluid, such as air, or substantially pure oxygen or oxygen-enriched air or ozone-enriched air or nitrogen into the sewage located in an aeration tank in order to provide an aerobic biological treatment.

The present invention provides a system for fluid dispersion that is modular, i.e., the system can be simply sized and configured for a wide variety of applications, all using a base module design that is designed for quick and efficient manufacturing, shipping, and installation of attachable equipment. Depending on the application, from one to one hundred or more base modules are assembled together to form the modular fluid distribution system.

The base module comprises a frame structure having side pieces and end caps. Fluid distribution conduits are secured within the frame structure and include any number of apertures to allow connectivity and a fluid flow communication path to additional equipment, most commonly a diffuser assembly. End caps are coupled together and may form a manifold for fluid distribution. Side pieces may be coupled together to expand the modular system. A fluid supply pipe is coupled to the manifold and a fluid supply source to provide fluid pressure to the modular system for fluid dispersion.

One aspect of the invention provides a module for use in a fluid dispersion system. The module includes a frame structure comprising at least one side piece and at least one end cap, at least one fluid distribution conduit, the fluid distribution conduit including a first end and a second end, and at least one aperture having an inside diameter, the at least one aperture positioned in a wall of the fluid distribution conduit and sized and configured for fluid flow communication with attachable equipment, and means for securing the fluid distribution conduit within the frame structure.

The frame structure may be made of stainless steel or powder coated steel or galvanized steel or synthetic materials or any combination of stainless steel or powder coated steel or galvanized steel or synthetic materials. The means for securing the at least one fluid distribution conduit within the frame structure may comprise active and/or passive clamping.

In one aspect of the invention, the frame structure includes at least two side pieces, and the means for securing the at least one fluid distribution conduit within the frame structure comprises a cross member to span between each frame side piece, and a passive clamping member for each fluid distribution conduit positioned on or in the cross member. The first end and/or the second end of the fluid distribution conduit may also include a flared portion to provide a fluid tight seal between the fluid distribution conduit and the end cap.

In yet another aspect of the invention, the at least one aperture is sized and configured to be fitted with a mating tube, the mating tube including an outside diameter that is greater than the aperture inside diameter. The combination of the mating tube fitted within the aperture comprises a fluid tight seal. In addition, the at least one aperture may comprise an inwardly slanting edge, the inwardly slanting edge substantially preventing extraction of the mating tube from the aperture. The inwardly slanting edge may extend more than a wall thickness of the distribution conduit into the distribution conduit.

Yet another aspect of the invention provides a fluid distribution system comprising at least a first base module coupled to a second base module, the first base module and the second base module each comprise a frame structure comprising at least one side piece and at least one end cap, and at least one fluid distribution conduit, the fluid distribution conduit secured within the frame structure, the fluid distribution conduit including a first end and a second end, and at least one aperture having an inside diameter, the at least one aperture positioned in a wall of the fluid distribution conduit and sized and configured for fluid flow communication with attachable equipment, at least one end cap of the first base module being coupled to at least one end cap of the second base module and forming a ballast portion, and the first end of the fluid distribution conduit in the first base module extending through the first base module end cap and into the ballast portion, and the first end of the fluid distribution conduit in the second base module extending through the second base module end cap and into the ballast portion.

In one aspect of the invention, the second end of the fluid distribution conduit in the first base module may extend through a second end cap in the first base module, the second end of the fluid distribution conduit including a cap or plug to provide a fluid tight seal. The first end of the fluid distribution conduit in the first base module may extend through the first base module end cap and into the ballast portion, and the first end of the fluid distribution conduit in the second base module may extend through the second base module end cap and into the ballast portion are coupled to each other by a connector tube. In addition, the first end and/or the second end of the fluid distribution conduit may include a flared portion on the inside of the end cap and a flared portion on the outside of the end cap, the flared portions sized and configured to provide a fluid tight seal between the fluid distribution conduit and the end cap. The at least one fluid distribution conduit may be generally horizontal.

Yet another aspect of the invention provides methods of coupling a fluid distribution conduit to an apparatus for use in a sewage treatment system. The method comprises providing a fluid distribution conduit, the fluid distribution conduit including a first end and a second end and a wall, creating an aperture in the wall of the fluid distribution conduit, the aperture including an inwardly slanting edge and having an inside diameter, providing an apparatus, the apparatus including a mating tube having an outside diameter greater than the inside diameter of the aperture, the mating tube providing fluid flow communication between the fluid distribution conduit and the apparatus, and inserting into the aperture the mating tube of the apparatus to form a fluid tight seal, the inwardly slanting edge substantially preventing extraction of the mating tube from the aperture.

The methods may further include providing a frame structure comprising at least one side piece and at least one end cap, and means for securing the fluid distribution conduit within the frame structure, and positioning the fluid distribution conduit within the frame structure. The inwardly slanting edge may extend more than a wall thickness of the distribution conduit into the distribution conduit.

BRIEF DESCRIPTION OF THE DRAWINGS

FIG. 12 is a perspective view of the diffuser assembly of FIG. 11 mounted to a fluid distribution conduit.

FIG. 13 is a sectional view taken generally along line 13-13 of FIG. 3, showing an exemplary embodiment of an end cap.

FIG. 14 is a sectional view taken generally along line 14-14 of FIG. 3, showing an exemplary embodiment of a side piece.

The invention may be embodied in several forms without departing from its spirit or essential characteristics.

DESCRIPTION OF THE PREFERRED EMBODIMENT

Although the disclosure hereof is detailed and exact to enable those skilled in the art to practice the invention, the physical embodiments herein disclosed merely exemplify the invention which may be embodied in other specific structures. While the preferred embodiment has been described, the details may be changed without departing from the invention, which is defined by the claims.

The various aspects of the invention will be described in connection with a modular system for fluid dispersion, such as air, within a wastewater treatment facility. That is because the features and advantages of the invention are well suited for this purpose. Still, it should be appreciated that the various aspects of the invention can be applied in other forms where the modular structure and its novel construction may be used to disperse other fluids besides air, such as substantially pure oxygen, oxygen or ozone-enriched air, nitrogen, or water, for example. The modular systems and methods may also be used in other non-wastewater related applications requiring the dispersion of a fluid.

I. Modular Fluid Dispersion System

Figure 1:
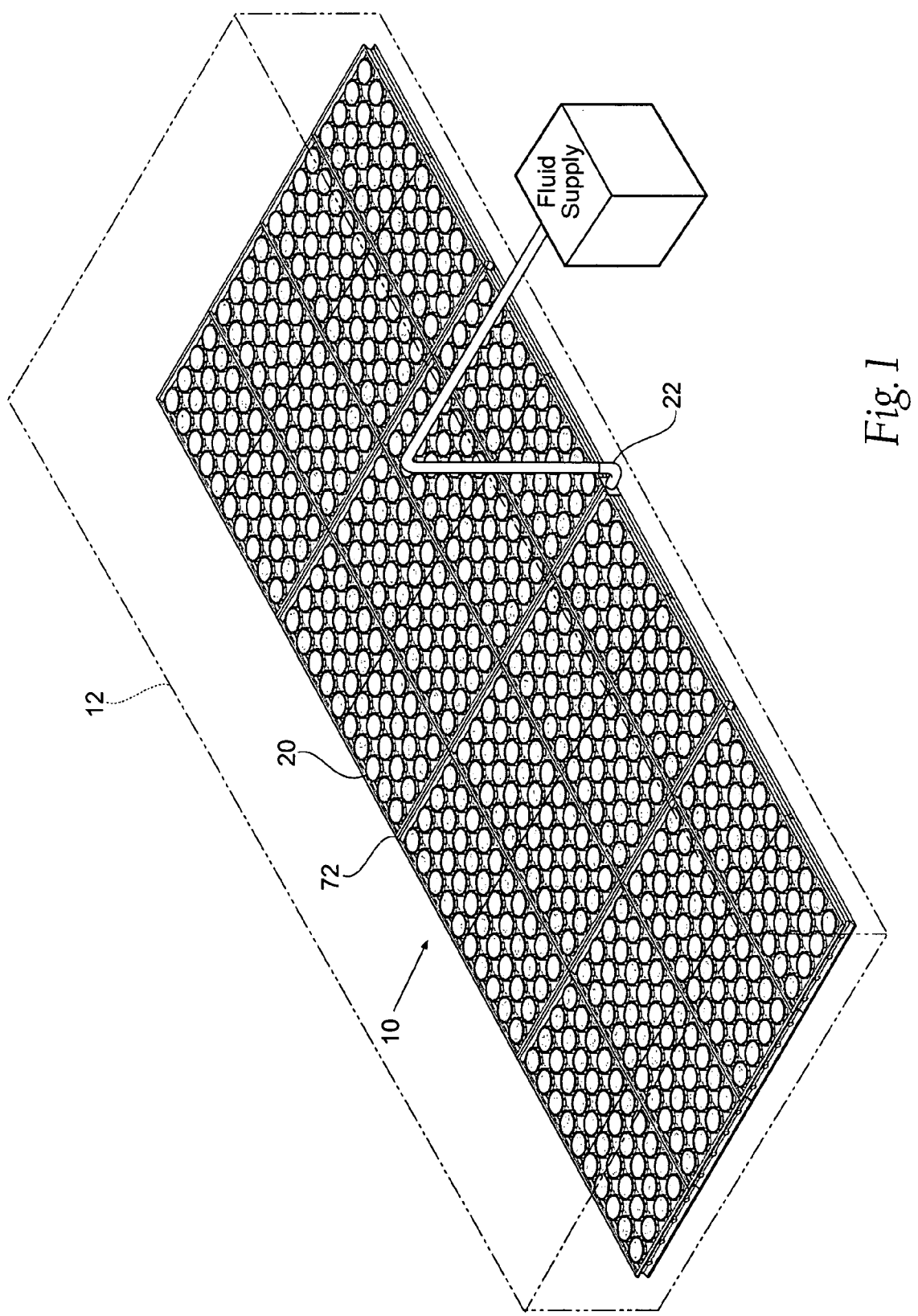
FIG. 1 is a perspective view of a modular system for fluid dispersion, showing the features of the present invention.

The present invention comprises a modular fluid dispersion system 10 used to disperse one or more fluids (e.g., air), into another fluid or fluids (e.g., sewage or wastewater). As can be seen in FIG. 1, an exemplary modular system 10 shown positioned in a tank 12 comprises a four by four grid of sixteen base modules 20 coupled together. It is to be appreciated that the four by four grid is only one example of the modularity of the system 10. The modular system 10 could comprise just one base module 20, or 100 or more base modules 20 coupled together, with one or more fluid supply pipes 22 to distribute the fluid to the modular system 10.

Figure 2:
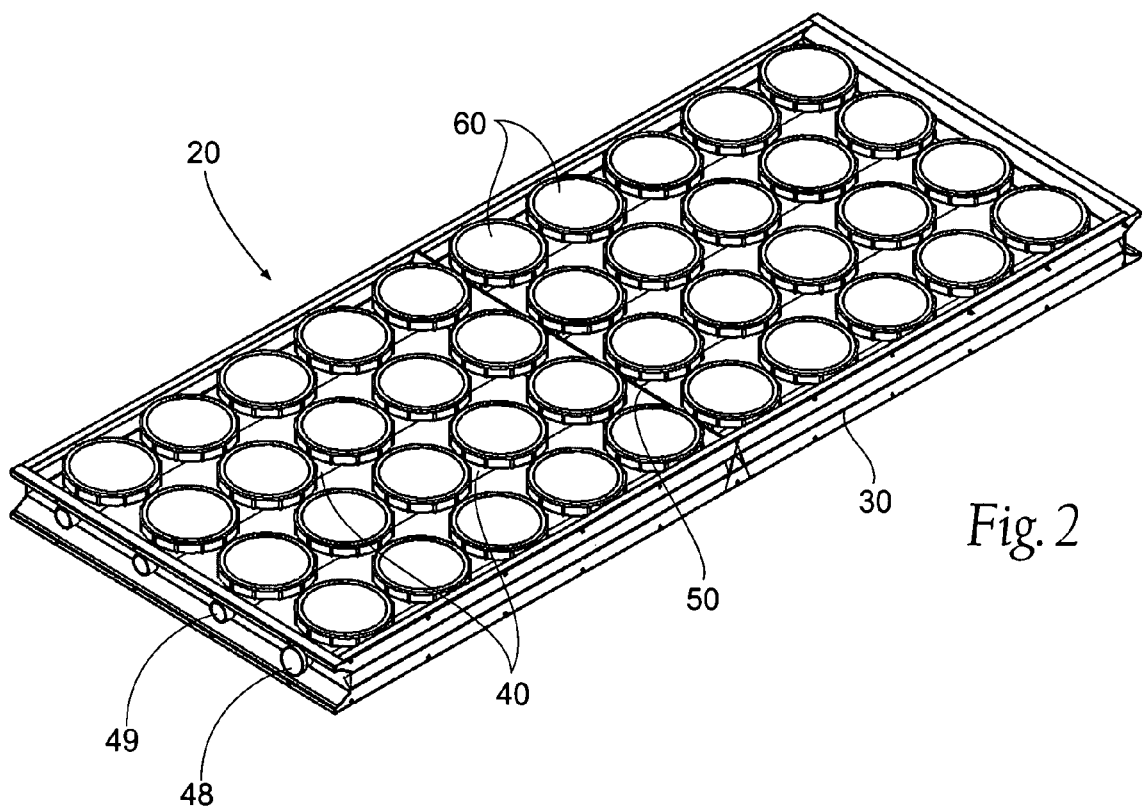
FIG. 2 is a perspective view of an exemplary embodiment of a base module included in the modular system shown in FIG. 1, showing the base module with diffuser assemblies coupled to the system.
Figure 3:
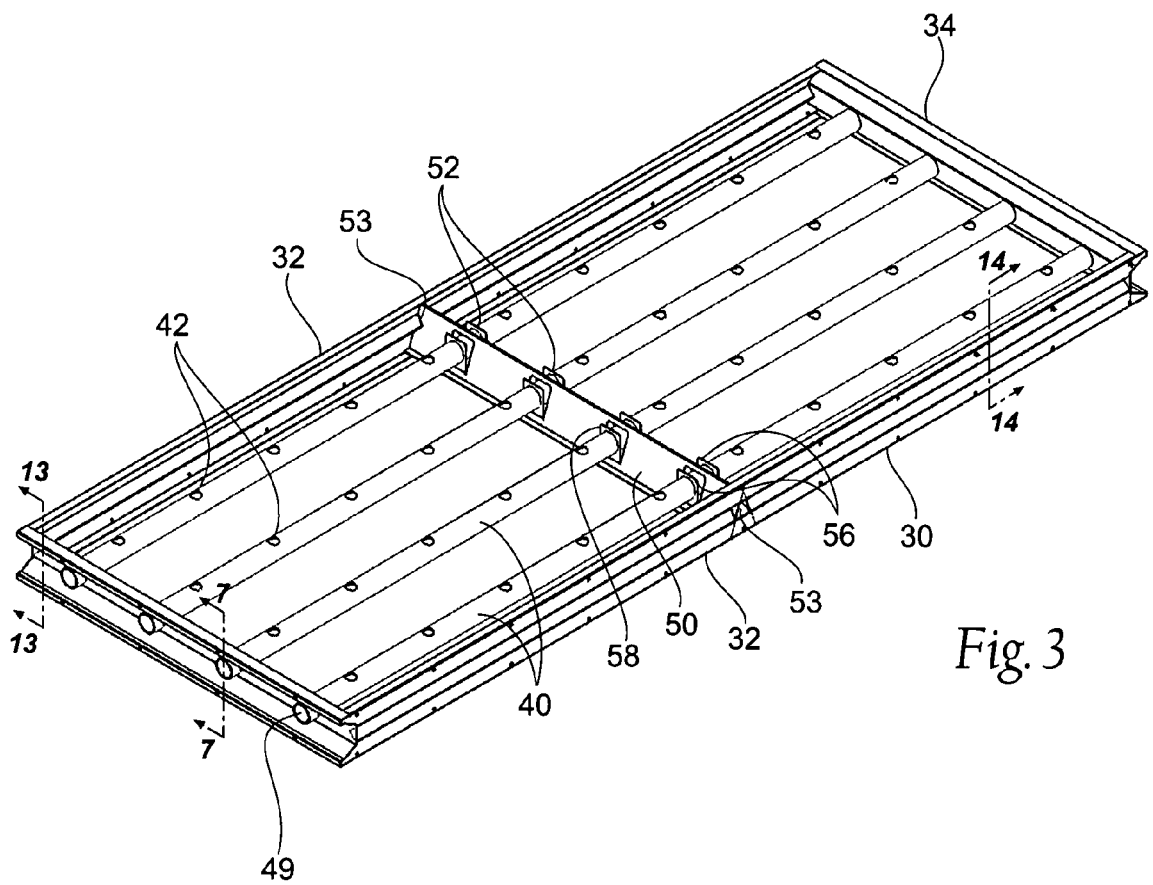
FIG. 3 is a perspective view of the base module shown in FIG. 2, showing the base module without diffuser assemblies coupled to the system.

FIGS. 2 and 3 show one embodiment of a base module 20. As can be seen, the base module 20 comprises a modular frame structure 30. The frame structure 30 supports one or more fluid distribution conduits 40 in a generally horizontal configuration, and means 50 for securing the fluid distribution conduits 40 within the frame structure 30. As FIG. 2 shows, each fluid distribution conduit 40 supports and is in fluid communication with one or more diffuser assemblies 60, as are known in the art. A flow control orifice (not shown) may be included with the diffuser assembly. As used in this disclosure, the terms "couple" (and derivatives) can include join, unite, connect, associate, insert, hang, hold, affix, attach, fasten, press, bind, paste, secure, bolt, nail, glue, screw, rivet, solder, weld, assemble, and other like terms.

Figure 4:
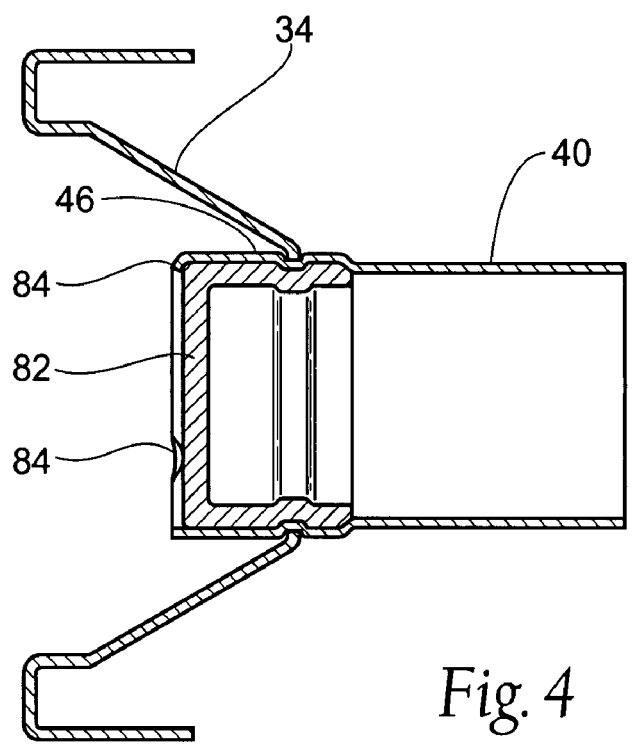
FIG. 4 is a side view in section of one embodiment of sealing means for the end of a fluid distribution conduit.

On sections of the base module 20 that are not further coupled to additional base modules, sealing means, such as a fluid tight cap 48, may be coupled (e.g., welded, glued, pressed) to the end 49 of the fluid distribution conduit 40. Alternatively, the ends 49 of distribution conduit 40 may be sealed by pressing a plug 82 into the end 49 of the distribution conduit 40 (e.g., similar to a "freeze plug"). The plug 82 may be further secured in place by crimping 84 the edge of the distribution conduit against the plug 82 (see FIG. 4). The cap 48 and plug 82 may be constructed of a variety of materials, such as stainless steel, PVC, rubber, or synthetic materials, for example.

FIG. 3 is a view of the base module 20 with the diffuser assemblies 60 removed. As shown, the frame structure 30 is rectangular in shape. It is to be appreciated that the frame structure 30 may take on other shapes as well, such as square or polygon, for example. The frame structure 30 shown includes two side pieces 32 and two end caps 34. Each side piece 32 may be constructed the same and each end cap 34 may be constructed the same, i.e., each side piece 32 is replaceable with the other, and each end cap 34 is replaceable with the other. In addition, each side piece 32 and each end cap 34 may be symmetrical (see FIGS. 13 and 14). This enhances the modularity and strength of the frame system 30, and reduces the number of component parts necessary to assemble the frame structure 30.

The frame side pieces 32 and end caps 34 may be coupled together by a number of common methods such as tack welded or bolted or snap fit together, as non-limiting examples. The frame structure could be constructed of stainless steel, powder coated steel, galvanized steel, synthetic materials, or combinations of the above, for example.

When coupled together, the modular frame structure 30 supports and/or contains one or more fluid distribution conduits 40. These conduits may be made of PVC or stainless steel, for example, or some of each to affect the balance and weight of the base 20. Each distribution conduit 40 includes one or more apertures 42 positioned generally at longitudinally spaced intervals along the top center line, although the apertures 42 may be offset to affect spacing of attached equipment. Each aperture 42 in the wall of the distribution conduit provides a fluid flow communication path for the equipment to be coupled to the distribution conduits 40, such as diffuser assemblies 60 (see FIG. 2). Alternately, the distribution conduit itself could be perforated and used as a diffuser.

Still referring to FIG. 3, generally in the middle of the frame structure 30 is positioned one or more means 50 for securing the fluid distribution conduits 40 within the frame structure 30. The means 50 can be passive or active clamping.

As shown, the means comprises a generally inverted "V" shaped cross member 50 to span between each frame side piece 32, and a passive clamping member 52 for each fluid distribution conduit 40 positioned on or in the cross member 52. It is to be appreciated that the shape of the cross member can be varied depending on the type of active or passive clamping used. The cross member may be secured to the frame side pieces by conventional means, or as shown, slots 53 in each side piece 32 allow for simple assembly without tools of the cross member to the frame 30. The clamping member 52 helps to anchor its respective conduit 40 in both longitudinal and latitudinal directions.

Figure 5:
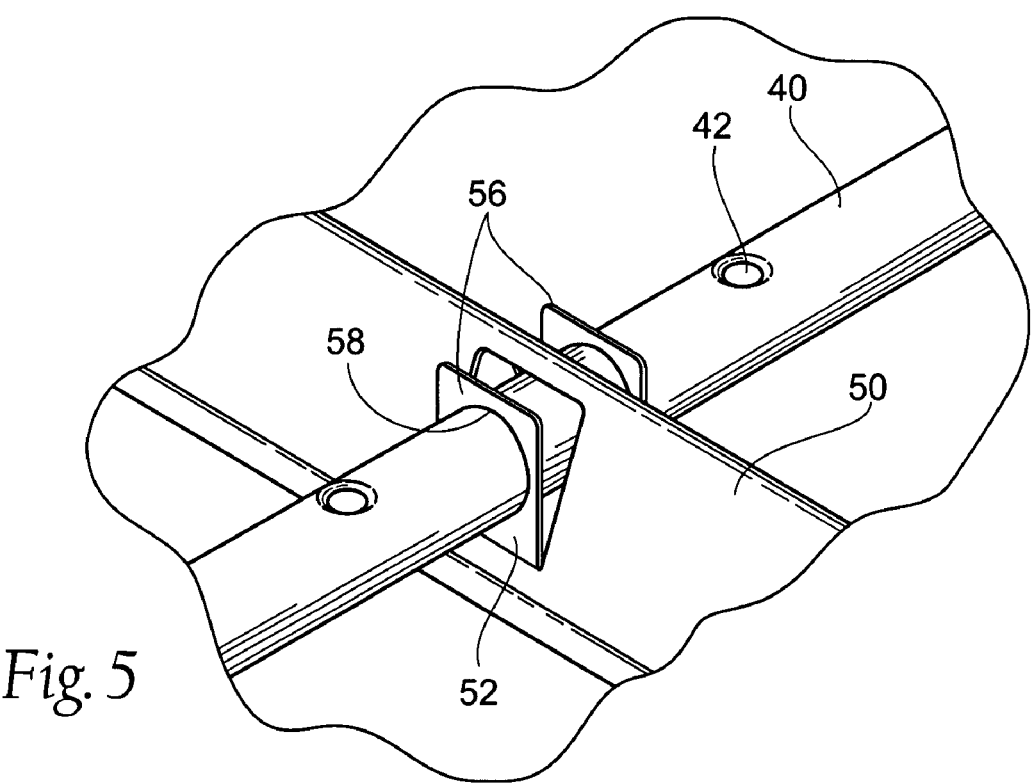
FIG. 5 is a perspective view of one embodiment of means for securing a fluid distribution conduit within the frame structure.

As shown in FIG. 5, the clamping member 52 is an integral component of the cross member 50, and comprises cutout wings 56 having an aperture 58 that are opened to a generally perpendicular position to allow the distribution conduit 40 to pass through the aperture 58. When the distribution conduit 40 is positioned within the frame structure 30, the tension force applied to the wings 56 is removed and the wings attempt to go back to the general inverted "V" shape, securing the distribution conduit 40 in place.

Figure 6A:
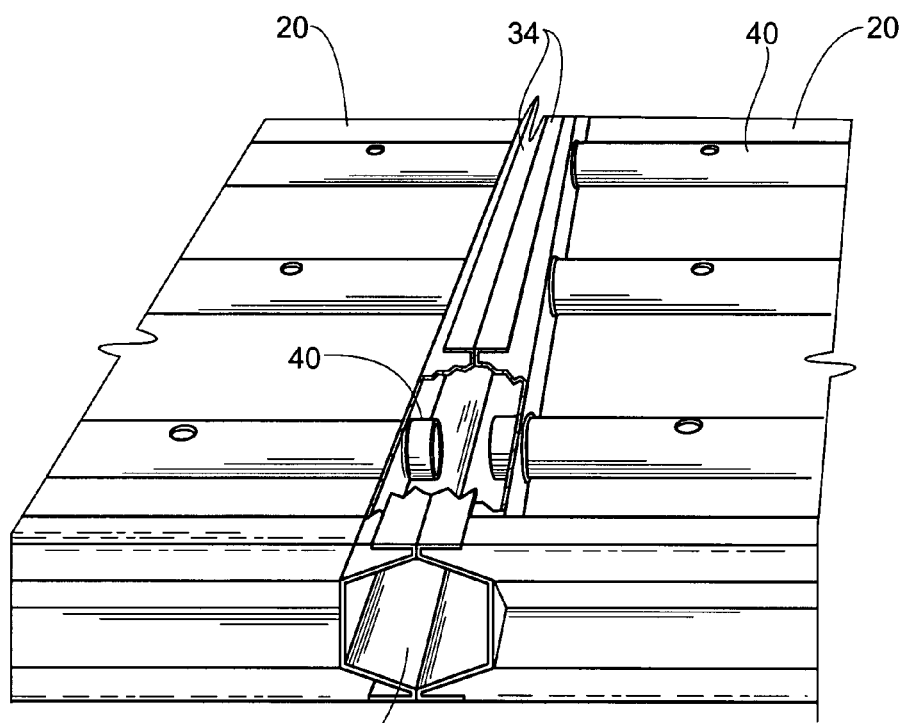
FIG. 6A is a perspective view with a partial cutout showing the end caps of two base modules coupled together, and without a supply tube or manifold cap coupled to the manifold.
Figure 6B:
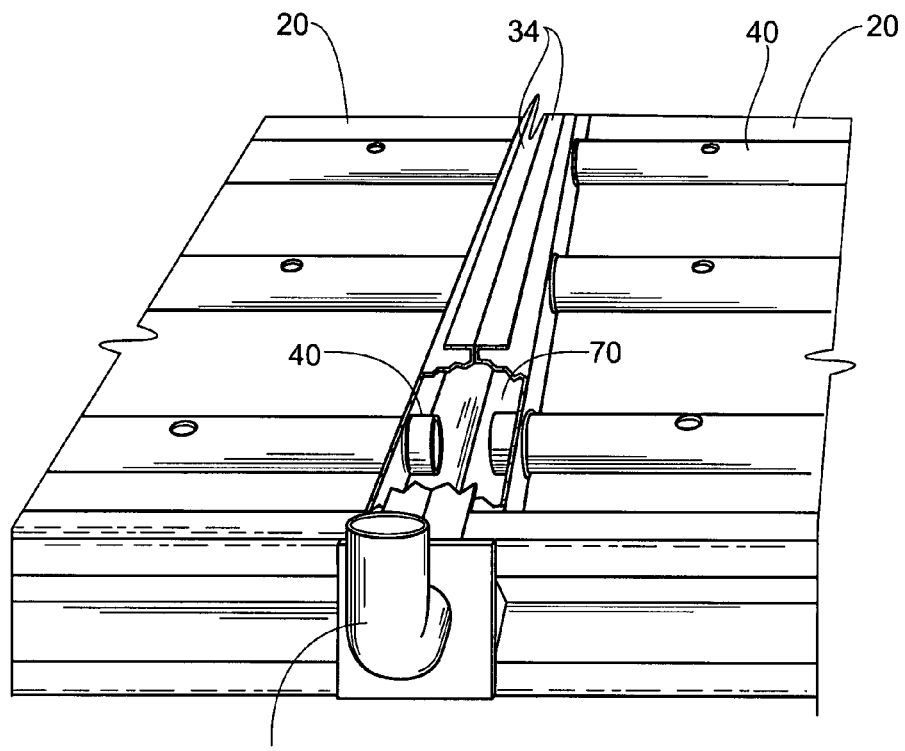
FIG. 6B is a perspective view with a partial cutout showing the end caps of two base modules coupled together as shown in FIG. 6A, and showing a supply tube coupled to the manifold.
Figure 6C:
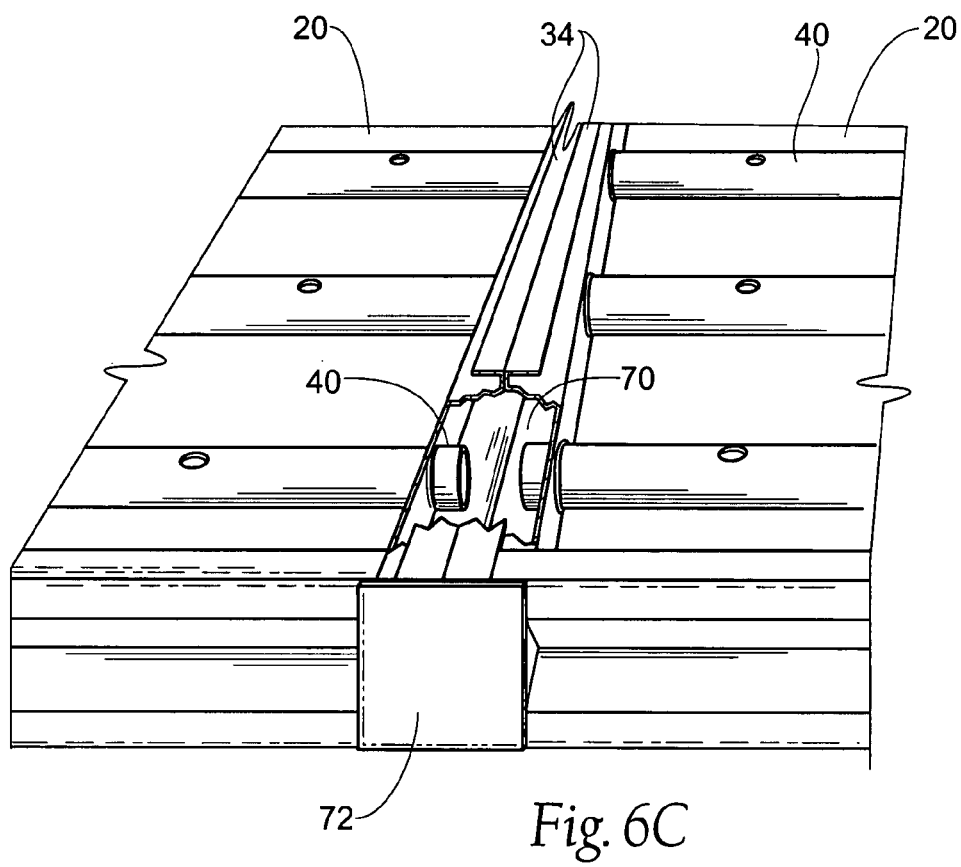
FIG. 6C is a perspective view with a partial cutout showing the end caps of two base modules coupled together as shown in FIG. 6A, and showing a manifold cap coupled to the manifold.
Figure 7:
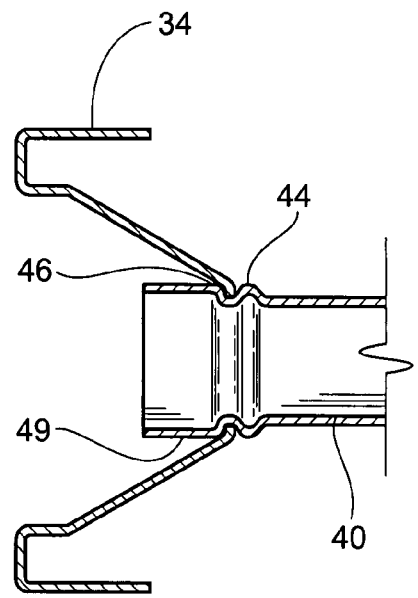
FIG. 7 is a side view taken generally along line 7-7 of FIG. 3, showing an exemplary embodiment of a fluid distribution conduit sealed to the end cap by expanding the fluid distribution conduit at the inside of the end cap and at the outside of the end cap.

As can be seen in FIGS. 6A to 6C, when one end cap 34 from one base module 20 is coupled to another end cap 34 from another base module 20, a fluid distribution manifold 70 is created, allowing fluid flow from one base module 20 to another base module 20. In order to provide a fluid tight seal between the manifold 70 and the distribution conduits 40, the frame end caps 34 may be coupled (i.e., sealed) to the distribution conduits 40. This can be accomplished in a number of ways. For example, the distribution conduit 40 can be mechanically coupled to the end cap 34 by expanding the distribution conduit 40 on the inside and/or outside of the end cap 34, as can be seen in FIG. 7. Inside expansion 44 and outside expansion 46 provide a fluid tight seal between the manifold 70 and the distribution conduit 40. Alternatively, the distribution conduit(s) 40 could be glued, welded, gasketed, or combinations, for example, to the end caps 34 to form the fluid tight seal.

In the illustrated embodiment, the manifold 70 is sized and configured to accept a four inch fluid supply pipe 22 (see FIGS. 1 and 6B). It is to be appreciated that the size of the pipe 22 can be larger or smaller, depending on the overall size and fluid supply needs of the modular system 10. As shown, the fluid supply pipe 22 comprises a four inch schedule 80 PVC elbow, although the pipe 22 does not need to be an elbow, and it may comprise other materials as well (e. g. , stainless steel, powder coated steel, galvanized steel, synthetic materials, or combinations of the above, for example). A manifold cap 72 is also included to provide the fluid tight seal on the opposite side of the manifold 70 when a fluid supply pipe is used (see FIGS. 1 and 6C), or in those cases where the end caps 34 of two base modules 20 are coupled together and fluid supply pipe 22 is not installed (see FIG. 6C).

Figure 8:
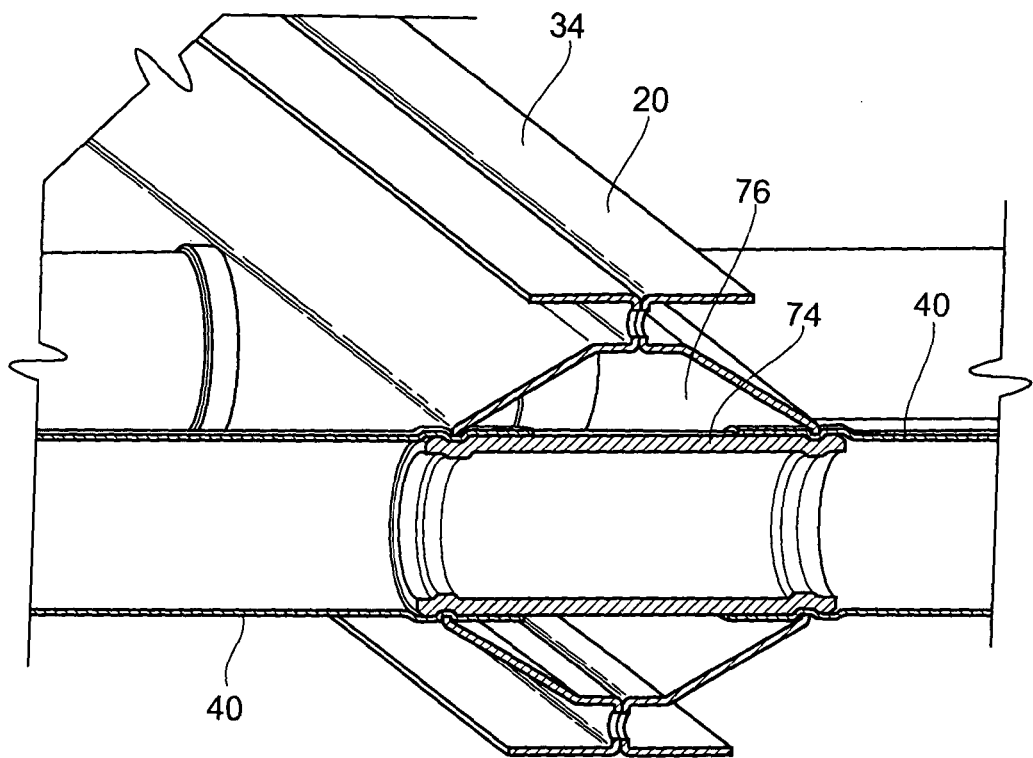
FIG. 8 is a partial perspective view with parts in section showing a connector tube used to connect distribution conduits from one base module to the next.

The manifold could be used for system stabilization, i.e., to serve as a ballast. As can be seen in FIG. 8, connector tube 74 can be used to couple distribution conduits 40 from one base module 20 to the next (i.e., to provide a fluid tight connection), creating a space 76 where ballast can be added if additional weight is required to overcome buoyancy. A connector tube 74 may be made of PVC or stainless steel, for example, or some of each to affect balance and weight of base module 20. The space 76 could be filled with a concrete or grout material. Other materials, such as rebar, could be positioned in the space as well. The inclusion of some materials would desirably take place during the assembly of the modular system (such as concrete), while other materials could be added to an installed and operating modular system 10 (such as rebar). For example, a two by four grid of base modules 20 could be assembled together with the inclusion of materials in the space 76 and still be of a size that would allow for standard shipping and transportation methods.

Alternatively, or in combination, the end caps 72 (see FIG. 6C) may be left off to allow the space 76 (see FIG. 8) to fill with the fluid that the modular system 10 is positioned in. The filling of the space with the surrounding fluid would allow for additional neutral buoyancy.

Figure 9:
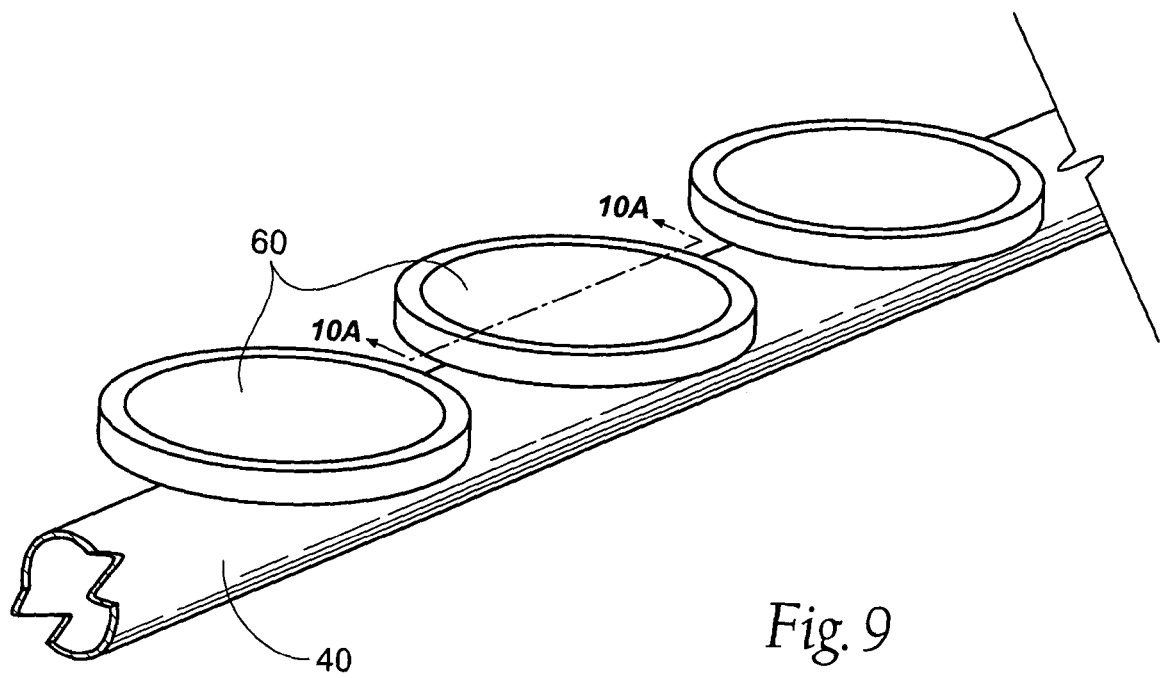
FIG. 9 is a perspective view of a section of a distribution conduit with diffuser assemblies attached.

As previously described, each fluid distribution conduit 40 is sized and configured to support one or more assemblies, such as a diffuser assembly 60, as shown in FIG. 9. As shown, a representative diffuser assembly may be generally round in plan view, although other shapes, such as oval, square, rectangular, polygonal, and irregular, may also be used with the present invention.

Figure 10A:
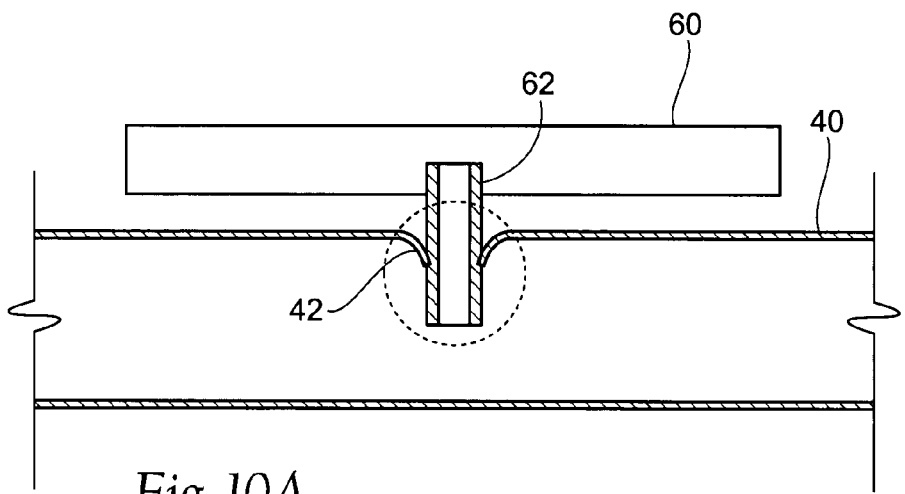
FIG. 10A is a side view in section taken generally along line 10A-10A of FIG. 9, showing a mating tube installed in the aperture formed in the fluid distribution conduit, the mating tube and aperture forming a fluid tight friction lock.
Figure 10B:
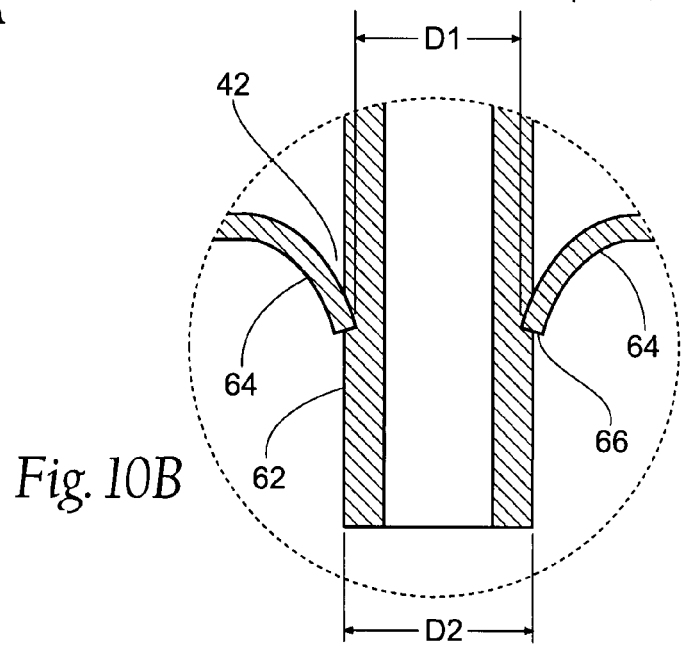
FIG. 10B is a close-up view in section of the fluid tight friction lock shown in FIG. 10A, showing the slanting edge of the aperture biting into the mating tube to provide the fluid tight friction lock.

The present invention includes systems and methods for attaching equipment, such as a diffuser assembly 60, to the distribution conduit 40. As seen in FIGS. 10A and 10B, an aperture 42 is made in the wall of the distribution conduit 40 (e.g., formed, cut, punched, drilled), the aperture 42 having a predetermined size and inside diameter D2. A properly sized mating tube 62 providing fluid flow communication may then be inserted into the aperture 42. The mating tube 62 desirable includes an outside diameter D2 that is greater than the inside diameter D1 of the aperture 42. The mating tube may comprise stainless steel, PVC, rubber, or synthetic materials, for example, and may be the same material as the distribution conduit 40, or may be a different material. The installed mating tube 62 forms a fluid tight friction lock or interference fit 66 with the aperture 42.

Desirably, the properly sized aperture 42 includes an inwardly slanting edge 64, as can be best seen in FIG. 10B. The slanting edge 64 can be a straight edge, or can be somewhat arcuate, as shown (either inward or outward). As used in this disclosure, the term "slant" (and derivatives) is intended to mean to veer or angle away from a given level or line, such as a horizontal, and/or to have a slope. The slanting edge 64 bites into the mating tube 62 to provide the fluid tight interference fit 66. In one embodiment, the slanting edge extends more than a wall thickness of the distribution conduit 40 into the distribution conduit. Testing has shown the interference fit of the aperture 42 and mating tube 62 is capable of withstanding fluid pressures of 100 pounds per square inch (psi), which is in excess of what is commonly found in wastewater treatment systems.

Figure 11:
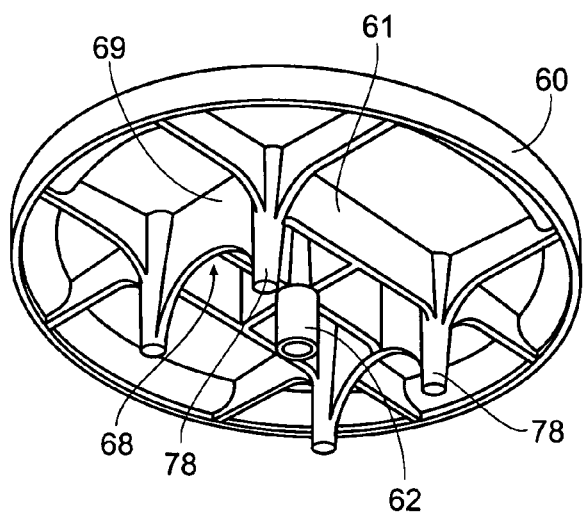
FIG. 11 is a bottom perspective view of an exemplary embodiment of a mating tube and anti-torque means incorporated into a diffuser assembly.

In use, the mating tube 62 may be a component of (e.g., molded into) or coupled (e.g., glued, welded, pressed) to a wide variety of assemblies to then be coupled to the distribution conduit 40. As can be seen in FIG. 11, the mating tube 62 is shown as a component of the diffuser assembly 60.

In order to aid in the prevention of any disturbances at the interference fit 66 between the aperture 42 and the mating tube 62, the installed equipment (e.g., diffuser assembly 60) desirably includes anti-torque means 68. In a representative embodiment shown in FIGS. 11 and 12, the base 61 of the installed diffuser assembly 60 shows the anti-torque means 68 comprising an anti-torque saddle 69 that generally conforms to the exterior shape of the distribution conduit 40. One or more posts 78 may also be included to reduce or prevent rotation of the diffuser assembly 60. The anti-torque means 68 may also comprise gluing, welding, or clamping, for example.

II. Desirable Technical Features

The modular systems and methods of the present invention provide many features and benefits for improved fluid dispersion.

A. Self Supporting Modular Structure

The modular system 10 comprises a self-supporting structure for all methods of installation and use. The construction of the structure provides sufficient weight and/or a method of attachment to allow the system to remain at the bottom of the wastewater treatment tank 12 even when the system includes a less dense fluid such as air. In some applications, additional weights may be included with the structure to ensure the structure maintains its position at the bottom of the tank. Alternatively, the modular system may be mounted to pylon(s) (not shown) or suspended in the tank.

B. Diversification of Attached Equipment

The modular system allows for the diversity of installed or attached equipment. For example, fluid distribution systems commonly incorporate one or more "diffusers." Diffuser assemblies are generally known in the art and come in many shapes and sizes to meet a particular application. The modular system of the present invention is sized and configured to simply and conveniently accept most known diffuser assembly configurations.

C. Fluid Tight Attachment of Equipment

The modular system incorporates fluid tight systems and methods of attachment for installable equipment. The systems and methods allow for automation, and ease of assembly. An appropriately sized aperture is formed in the wall of the distribution conduit. A mating tube with an outside diameter greater than the inside diameter of the formed aperture is pushed into the aperture to form a fluid tight seal or interference fit. The shape of the aperture substantially prevents extraction of the mating tube coupled to or incorporated in the installable equipment.

D. Improved Modification

The modular system establishes a location in space for the installed or attached equipment relative to the modular system. The design of the modular system can be modified to accept a wide assortment of installed or attached equipment, yet maintaining the modular features of the system.

E. Self Protecting Structure

The modular system offers physical protection for itself. The base module of the modular system provides protection for the system not only in operation, but in shipping or transportation as well. The self contained base modules may also be stacked and banded together for shipping. In addition, the construction of the modular system allows the system to be installed into an operating wastewater treatment tank, saving considerable time and expense during installation.

F. Incorporation of Distribution System

The modular system provides a distribution system as part of the modular system itself. The modular structure of the base module is used as an active element of the distribution system. For example, when two base modules are coupled together, a manifold is created that may be used to supply the fluid to the installed or attached equipment, such as the diffuser assemblies, and/or to supply the fluid to the coupled base module.

G. Infinitely Scaleable

The modular system includes an infinitely scaleable base module or modules. The base module can be symmetrical, semi-symmetrical, and/or orientation specific. The base modules can be any convenient size. In the illustrated embodiment, the base modules are shown to be about four feet wide by about ten feet long, although it is to be appreciated that the concepts of the invention allow the size of the base module to be any size that serves the purpose of convenient fluid dispersion.

The scaleable base module is what allows the modular system to be infinitely scaleable. By coupling multiple base modules together, the modular system is able to be used for most, if not all, tank configurations.

H. Automated Manufacturing

The modular design of the system not only allows for automating the manufacturing of the base modules, but also facilitates the packing for transportation and the construction of the modular system on site at the treatment facility.

The foregoing is considered as illustrative only of the principles of the invention. Furthermore, since numerous modifications and changes will readily occur to those skilled in the art, it is not desired to limit the invention to the exact construction and operation shown and described. While the preferred embodiment has been described, the details may be changed without departing from the invention, which is defined by the claims.

We claim:

1. A module for use in a fluid dispersion system comprising:
    a frame structure comprising at least two side pieces and at least one end cap,
    at least one fluid distribution conduit, the fluid distribution conduit including a first end and a second end, and at least one aperture having an inside diameter, the at least one aperture positioned in a wall of the fluid distribution conduit and sized and configured for fluid flow communication with attachable equipment, and
    means for securing the at least one fluid distribution conduit within the frame structure, the means comprising a cross member to span between each frame side piece, and a passive clamping member for each fluid distribution conduit positioned on or in the cross member.

2. A module according to claim 1:
    wherein the frame structure comprises at least one of a stainless steel, a powder coated steel, a galvanized steel, and a synthetic material.

3. A module according to claim 1:
    wherein the module is sized and configured to allow one or more modules to be stacked on top of each other.

4. A module according to claim 1:
    wherein the first end and/or the second end of the fluid distribution conduit includes a flared portion to provide a fluid tight seal between the fluid distribution conduit and the end cap.

5. A module according to claim 1:
    wherein the end cap comprises a symmetrical cross section.

6. A module according to claim 1:
    wherein the side piece comprises a symmetrical cross section.

7. A module according to claim 1:
    wherein the frame structure comprises a polygon.

8. A module according to claim 1:
    wherein the frame structure comprises a rectangle.

9. A module according to claim 1:
    wherein the fluid dispersion system comprises a sewage treatment system.

10. A module according to claim 1:
    wherein the fluid dispersion system is adapted to disperse air or substantially pure oxygen or oxygen-enriched air or ozone-enriched air or nitrogen.

11. A module according to claim 1:
    wherein the at least one aperture is sized and configured to be fitted with a mating tube, the mating tube including an outside diameter that is greater than the aperture inside diameter, and
    wherein the combination of the mating tube fitted within the aperture comprises a fluid tight seal.

12. A module according to claim 11:
    wherein the at least one aperture comprises an inwardly slanting edge, the inwardly slanting edge substantially preventing extraction of the mating tube from the aperture.

13. A module according to claim 12:
    wherein the inwardly slanting edge extends more than a wall thickness of the distribution conduit into the distribution conduit.

14. A module according to claim 1:
    further including equipment coupled to the fluid distribution conduit, the equipment being in fluid flow communication with the fluid distribution conduit.

15. A module according to claim 14:
    wherein the equipment coupled to the fluid distribution conduit comprises a diffuser assembly.

16. A fluid distribution system comprising:
    at least a first base module coupled to a second base module,
    the first base module and the second base module each comprise a frame structure comprising at least one side piece and at least one end cap, and at least one fluid distribution conduit, the fluid distribution conduit secured within the frame structure, the fluid distribution conduit including a first end and a second end, and at least one aperture having an inside diameter, the at least one aperture positioned in a wall of the fluid distribution conduit and sized and configured for fluid flow communication with attachable equipment,
    at least one end cap of the first base module being coupled to at least one end cap of the second base module and forming a ballast portion, and
    the first end of the fluid distribution conduit in the first base module extending through the first base module end cap and into the ballast portion, and the first end of the fluid distribution conduit in the second base module extending through the second base module end cap and into the ballast portion.

17. A system according to claim 16:
    wherein the second end of the fluid distribution conduit in the first base module extends through a second end cap in the first base module, the second end of the fluid distribution conduit including a cap or plug to provide a fluid tight seal.

18. A system according to claim 16:
    wherein the first end of the fluid distribution conduit in the first base module extending through the first base module end cap and into the ballast portion, and the first end of the fluid distribution conduit in the second base module extending through the second base module end cap and into the ballast portion are coupled to each other by a connector tube.

19. A system according to claim 16:
    wherein the first end and/or the second end of the fluid distribution conduit includes a flared portion on the inside of the end cap and a flared portion on the outside of the end cap, the flared portions sized and configured to provide a fluid tight seal between the fluid distribution conduit and the end cap.

20. A system according to claim 16:
wherein the fluid distribution system comprises a sewage treatment system.

21. A system according to claim 16:
wherein the fluid distribution system is adapted to distribute air or substantially pure oxygen or oxygen-enriched air or ozone-enriched air or nitrogen.

22. A system according to claim 16:
wherein the at least one fluid distribution conduit is generally horizontal.

23. A system according to claim 16:
wherein the at least one aperture is sized and configured to be fitted with a mating tube, the mating tube including an outside diameter that is greater than the aperture inside diameter, and wherein the combination of the mating tube fitted within the aperture comprises a fluid tight seal.

24. A system according to claim 23:
wherein the at least one aperture comprises an inwardly slanting edge, the inwardly slanting edge substantially preventing extraction of the mating tube from the aperture.

25. A system according to claim 24:
wherein the inwardly slanting edge extends more than a wall thickness of the distribution conduit into the distribution conduit.

* * * * *